US010726633B2

(12) United States Patent
Deng et al.

(10) Patent No.: US 10,726,633 B2
(45) Date of Patent: Jul. 28, 2020

(54) SYSTEMS AND METHODS FOR GENERATING AND DISPLAYING ARTIFICIAL ENVIRONMENTS BASED ON REAL-WORLD ENVIRONMENTS

(71) Applicant: Facebook, Inc., Menlo Park, CA (US)

(72) Inventors: Eric Deng, Fremont, CA (US); Andrew Gold, Los Altos, CA (US)

(73) Assignee: Facebook, Inc., Menlo Park, CA (US)

(*) Notice: Subject to any disclaimer, the term of this patent is extended or adjusted under 35 U.S.C. 154(b) by 0 days.

(21) Appl. No.: 15/858,275

(22) Filed: Dec. 29, 2017

(65) Prior Publication Data

US 2019/0206141 A1 Jul. 4, 2019

(51) Int. Cl.
| G06T 19/20 | (2011.01) |
| G06T 19/00 | (2011.01) |
| G06T 7/70 | (2017.01) |
| G06K 9/00 | (2006.01) |
| H04N 7/15 | (2006.01) |
| G06T 17/00 | (2006.01) |
| G06F 3/01 | (2006.01) |
| G06T 15/50 | (2011.01) |
| H04N 7/14 | (2006.01) |
| G06T 5/00 | (2006.01) |

(52) U.S. Cl.
CPC ............ G06T 19/20 (2013.01); G06F 3/011 (2013.01); G06K 9/00288 (2013.01); G06T 7/70 (2017.01); G06T 15/503 (2013.01); G06T 17/00 (2013.01); G06T 19/00 (2013.01); G06T 19/006 (2013.01); H04N 7/147 (2013.01); H04N 7/152 (2013.01); H04N 7/157 (2013.01); *G06T 5/004* (2013.01); *G06T 2219/024* (2013.01); *G06T 2219/2021* (2013.01)

(58) Field of Classification Search
CPC combination set(s) only.
See application file for complete search history.

(56) References Cited

U.S. PATENT DOCUMENTS

| 2010/0312833 A1* | 12/2010 | Rimmer | G08B 21/0415 |
| | | | 709/204 |
| 2014/0156078 A1* | 6/2014 | Herzog | B25J 5/00 |
| | | | 700/259 |
| 2014/0160228 A1* | 6/2014 | Jeong | H04N 7/147 |
| | | | 348/14.12 |
| 2014/0304243 A1* | 10/2014 | Ramesh | G06F 16/182 |
| | | | 707/694 |
| 2016/0180743 A1* | 6/2016 | Ahmad | G06F 19/3418 |
| | | | 434/262 |
| 2016/0335512 A1* | 11/2016 | Bradski | G06K 9/00617 |
| 2018/0107441 A1* | 4/2018 | Aurongzeb | G06F 3/1423 |
| 2018/0154514 A1* | 6/2018 | Angle | B25J 5/007 |
| 2018/0182160 A1* | 6/2018 | Boulton | G06T 15/506 |
| 2018/0182163 A1* | 6/2018 | Tung | G06T 7/97 |
| 2018/0190023 A1* | 7/2018 | Anderson | G06T 7/13 |

* cited by examiner

*Primary Examiner* — Phung-Hoang J Nguyen
(74) *Attorney, Agent, or Firm* — FisherBroyles, LLP

(57) ABSTRACT

The disclosed computer-implemented method may include (1) identifying, via at least one sensor, an object of interest located within a real-world environment, (2) mapping an area of the real-world environment surrounding the object of interest, (3) generating a virtual environment based on the mapped area of the real-world environment surrounding the object of interest, and (4) displaying, in real-time, the object of interest within the virtual environment. Various other methods, systems, and computer-readable media are also disclosed.

21 Claims, 8 Drawing Sheets

SYSTEMS AND METHODS FOR GENERATING AND DISPLAYING ARTIFICIAL ENVIRONMENTS BASED ON REAL-WORLD ENVIRONMENTS

BACKGROUND

Modern computing devices provide a myriad of communication options for users to connect with one another. For example, users may employ various video conferencing applications to communicate with one another via video, and advances in virtual reality, augmented reality, and telepresence have also expanded the ways that users may communicate with and interact with each other in real, virtual, or mixed environments. For example, a user may employ a telepresence robot to remotely navigate through a real-world environment while viewing a real-time video feed of the real-world environment via the telepresence robot.

Unfortunately, traditional options for displaying real-world environments to remote users are limited. For example, displaying real-world environments to remote users as video images, such as via traditional video conferencing applications, may rob people located within such real-world environments of desired privacy. Additionally, such traditional displays of real-world environments may raise security concerns, as real-world environments may contain objects (e.g., people, documents, computer screens, areas, etc.) that may be subject to various security policies. Traditional video conferencing applications may display images of such objects to remote users, thereby potentially circumventing such security policies.

Furthermore, conventional options for representing real-world environments as artificial environments, such as through conventional computer-generated models and avatars, may not provide the same richness or efficiency as traditional video-based representations. This lack of richness or efficiency may be particularly problematic for person-to-person interactions. Hence, the instant application identifies and addresses a need for additional systems and methods for generating and displaying artificial environments based on real-world environments.

SUMMARY

As will be described in greater detail below, the instant disclosure describes various systems and methods for generating and displaying artificial environments based on real-world environments. For example, some embodiments of the instant disclosure may identify an object of interest, map an area of the real-world environment surrounding the object of interest, generate a virtual environment based on the mapped real-world environment, and display, in real-time, the object of interest within the virtual environment.

In one example, a computer-implemented method for generating and displaying artificial environments based on real-world environments may include (1) identifying, via at least one sensor, an object of interest located within a real-world environment, (2) mapping an area of the real-world environment surrounding the object of interest, (3) generating a virtual environment based on the mapped area of the real-world environment surrounding the object of interest, and (4) displaying, in real-time, the object of interest within the virtual environment.

In some embodiments, identifying the object of interest located within the real-world environment may include determining a location of the object of interest within the real-world environment. In such embodiments, displaying the object of interest within the virtual environment may include (1) determining a location within the virtual environment that corresponds to the determined location of the object of interest within the real-world environment, and (2) displaying the object of interest within the virtual environment at the determined location within the virtual environment that corresponds to the determined location of the object of interest within the real-world environment.

In some examples, the object of interest may include at least a portion of a person, and displaying the object of interest within the virtual environment may include displaying the portion of the person within the virtual environment to an additional person. In such examples, identifying the object of interest may include identifying the person based on at least one attribute of the person. In at least some examples, the attribute of the person may include at least one of (1) a biometric attribute of the person, or (2) an identifying token associated with the person. In some examples, the method may further include presenting a notification to the additional person that may include an indication of the identity of the person.

In at least some embodiments, the object of interest may include a restricted access object. In such embodiments, displaying the object of interest within the virtual environment may include displaying a model that represents the restricted access object within the virtual environment, the model including at least one of (1) a security notification, or (2) a masking virtual object.

In at least one example, mapping the area of the real-world environment surrounding the object of interest may include identifying an environmental object within the real-world environment surrounding the object of interest. In such examples, (1) identifying the environmental object may include determining a location of the environmental object within the real-world environment, (2) generating the virtual environment based on the mapped area of the real-world environment surrounding the object of interest may include generating a model for use in the virtual environment that represents the environmental object, and (3) displaying the object of interest within the virtual environment further may include displaying the model that represents the environmental object within the virtual environment at a location within the virtual environment that corresponds to the location of the environmental object in the real-world environment. In some further examples, the environmental object may include a restricted access object, and the model may include at least one of (1) a security notification, or (2) a masking virtual object.

In at least one embodiment, displaying the object of interest within the virtual environment may include displaying a real-time video image of the object of interest within the virtual environment. In some embodiments, displaying the object of interest within the virtual environment may include displaying the object of interest within the virtual environment via at least one of (1) a video conferencing application, (2) an augmented reality environment, or (3) a virtual reality environment.

In some examples, the sensor may include a camera. In additional examples, the sensor may be included in a mobile robot and/or telepresence robot located in the real-world environment.

In addition, a corresponding system for generating and displaying artificial environments based on real-world environments may include several modules stored in memory, including (1) an identifying module that identifies, via at least one sensor, an object of interest located within a real-world environment, (2) a mapping module that maps an area of the real-world environment surrounding the object of interest, (3) a generating module that generates a virtual environment based on the mapped area of the real-world environment surrounding the object of interest, (4) a displaying module that displays, in real-time, the object of interest within the virtual environment, and (5) at least one physical processor that executes the identifying module, the mapping module, the generating module, and the displaying module.

In some examples, the identifying module may identify the object of interest located within the real-world environment by determining a location of the object of interest within the real-world environment.

In some embodiments, the displaying module may display the object of interest within the virtual environment by (1) determining a location within the virtual environment that corresponds to the determined location of the object of interest within the real-world environment, and (2) displaying the object of interest within the virtual environment at the determined location within the virtual environment that corresponds to the determined location of the object of interest within the real-world environment. In further examples, the displaying module may display the object of interest within the virtual environment by displaying the object of interest within the virtual environment via at least one of (1) a video conferencing application, (2) an augmented reality environment, or (3) a virtual reality environment.

In some examples, the above-described method may be encoded as computer-readable instructions on a computer-readable medium. For example, a computer-readable medium may include one or more computer-executable instructions that, when executed by at least one processor of a computing device, may cause the computing device to (1) identify, via at least one sensor, an object of interest located within a real-world environment, (2) map an area of the real-world environment surrounding the object of interest, (3) generate a virtual environment based on the mapped area of the real-world environment surrounding the object of interest, and (4) display, in real-time, the object of interest within the virtual environment.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
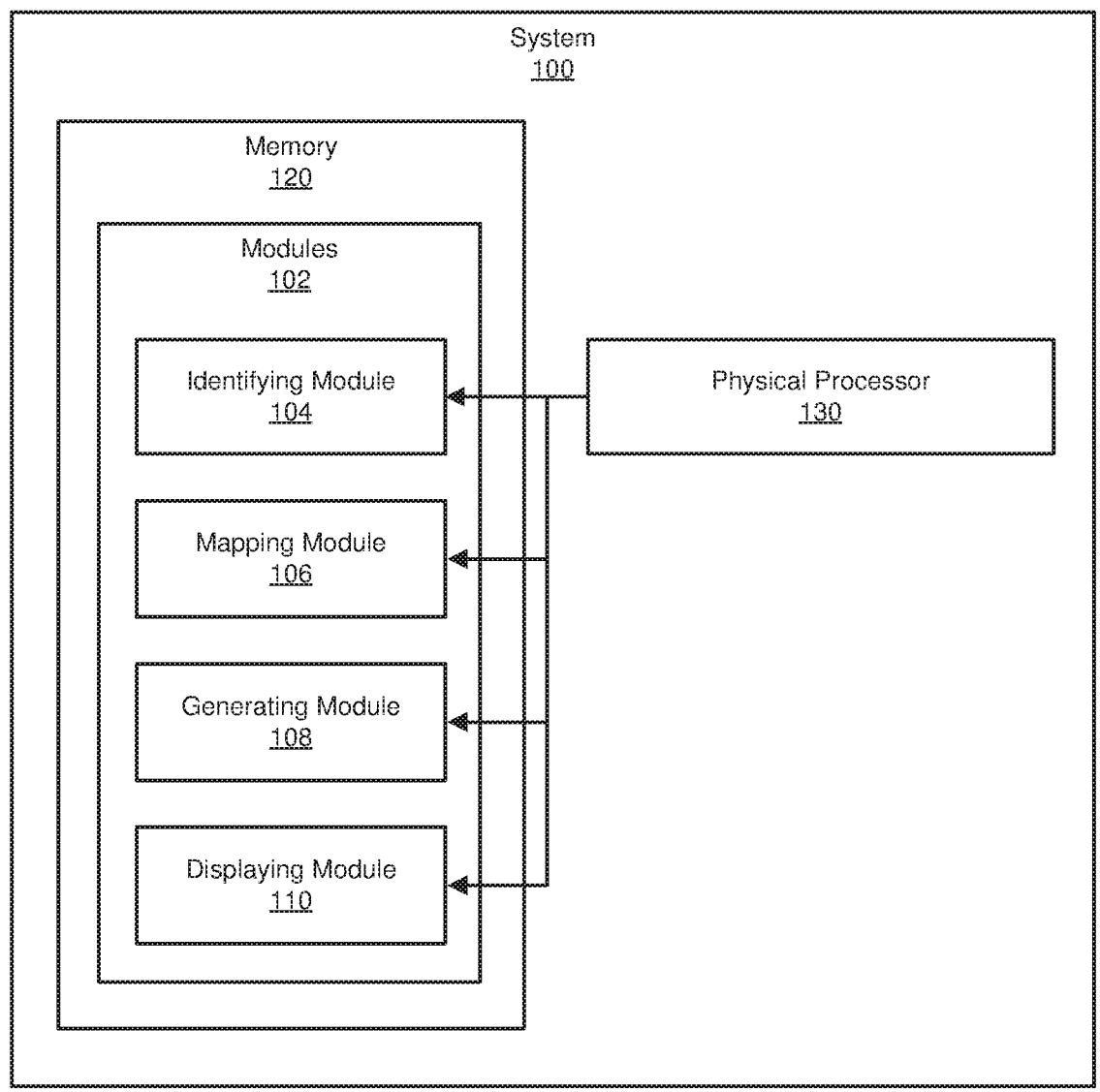
FIG. 1 is a block diagram of an example system for generating and displaying artificial environments based on real-world environments.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for generating and displaying artificial environments based on real-world environments. As will be explained in greater detail below, embodiments of the instant disclosure may identify, via at least one sensor (e.g., a camera, a depth sensor, a proximity sensor, etc.), an object of interest located within a real-world environment, such as a person, a document, a background, a structure (e.g., a wall), and so forth. In some examples, the embodiment may identify the object of interest by determining a location of the object of interest within the real-world environment.

An embodiment may also map an area of the real-world environment surrounding the object of interest, such as by identifying and/or determining a location of an environmental object (e.g., a background, a document, a piece of furniture, a structure, a computer screen, etc.) within the real-world environment surrounding the object of interest. An embodiment may also generate a virtual environment based on the mapped area of the real-world environment surrounding the object of interest, such as by generating a model for use in the virtual environment that represents the environmental object.

An embodiment may also display, in real-time, the object of interest within the virtual environment, such as by determining a location within the virtual environment that corresponds to the determined location of the object of interest within the real-world environment, and displaying the object of interest at the determined location within the virtual environment. In some examples, the embodiment may also display the generated model of the environmental object at a location within the virtual environment that corresponds to the location of the environmental object within the real-world environment. In some examples, displaying the object of interest within the virtual environment may result in the object of interest appearing as if it is located within the generated virtual environment. In examples where the object of interest is at least a portion of a person, this may result in the portion of the person appearing at a location within the virtual environment that corresponds to a location of the portion of the person in the real-world environment.

By mapping an area of a real-world environment surrounding an identified object of interest (e.g., a person), generating a virtual environment based on the mapped area, and displaying the object of interest within the virtual environment, the systems and methods described herein may effectively provide an artificial environment that represents the area surrounding the object of interest, and may provide a rich representation (e.g., a video-based representation) of the object of interest within the virtual environment. The systems and methods described herein may also provide an increased degree of privacy by masking certain environmental objects (e.g., documents, areas, people, furniture items, computer screens, etc.) located within the real environment with virtual objects within the virtual environment, and may also provide useful information about objects in the real-world environment (e.g., identification information regarding people within the real-world environment) to remote viewers via the generated and displayed virtual environment.

Additionally, embodiments of the instant disclosure may provide for a more efficient usage of telecommunications resources (e.g., bandwidth) than traditional remote viewing options. For example, in one scenario, a remote user may traverse a real-world environment using a remote computing device in communication with a mobile and/or telepresence robot. When the remote computing device and/or the telepresence robot encounter bandwidth restrictions, the real-world environment may be presented to the remote user via the remote computing device as a virtual environment that represents the real-world environment, rather than as a real-time video image of the real-world environment. Such a use case may use significantly fewer bandwidth resources than a traditional real-time video image of the real-world environment transmitted from the telepresence robot to the remote computing device.

Additionally, if a remote user encounters an object (e.g., a person) within the virtual environment that the remote user wishes to interact with via a rich presentation (e.g., a video image), the systems and methods described herein may seamlessly present the rich presentation of the object of interest (e.g., a video image of the object of interest) within the virtual environment while omitting, obscuring, or masking out portions of the real-world environment. This may provide many of the same benefits as a traditional video conference (e.g., face-to-face communication) while utilizing significantly fewer bandwidth resources, as video of the real-world environment surrounding the object of interest may not need to be transmitted from the telepresence robot to the remote user. Additional benefits may be made apparent through the descriptions and illustrations provided herein.

The following will provide, with reference to FIGS. 1-2 and 4-8, detailed descriptions of systems for generating and displaying artificial environments based on real-world environments. Detailed descriptions of corresponding computer-implemented methods will also be provided in connection with FIG. 3.

FIG. 1 is a block diagram of an example system 100 for generating and displaying artificial environments based on real-world environments. As illustrated in this figure, example system 100 may include one or more modules 102 for performing one or more tasks. As will be explained in greater detail below, modules 102 may include an identifying module 104 that identifies, via at least one sensor, an object of interest located within a real-world environment and a mapping module 106 that maps an area of the real-world environment surrounding the object of interest. Example system 100 may additionally include a generating module 108 that generates a virtual environment based on the mapped area of the real-world environment surrounding the object of interest, and a displaying module 110 that displays, in real-time, the object of interest within the virtual environment.

As further illustrated in FIG. 1, example system 100 may also include one or more memory devices, such as memory 120. Memory 120 generally represents any type or form of volatile or non-volatile storage device or medium capable of storing data and/or computer-readable instructions. In one example, memory 120 may store, load, and/or maintain one or more of modules 102. Examples of memory 120 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

As further illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 120. Additionally or alternatively, physical processor 130 may execute one or more of modules 102 to facilitate generating and displaying artificial environments based on real-world environments. Examples of physical processor 130 include, without limitation, microprocessors, microcontrollers, central processing units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Figure 2:
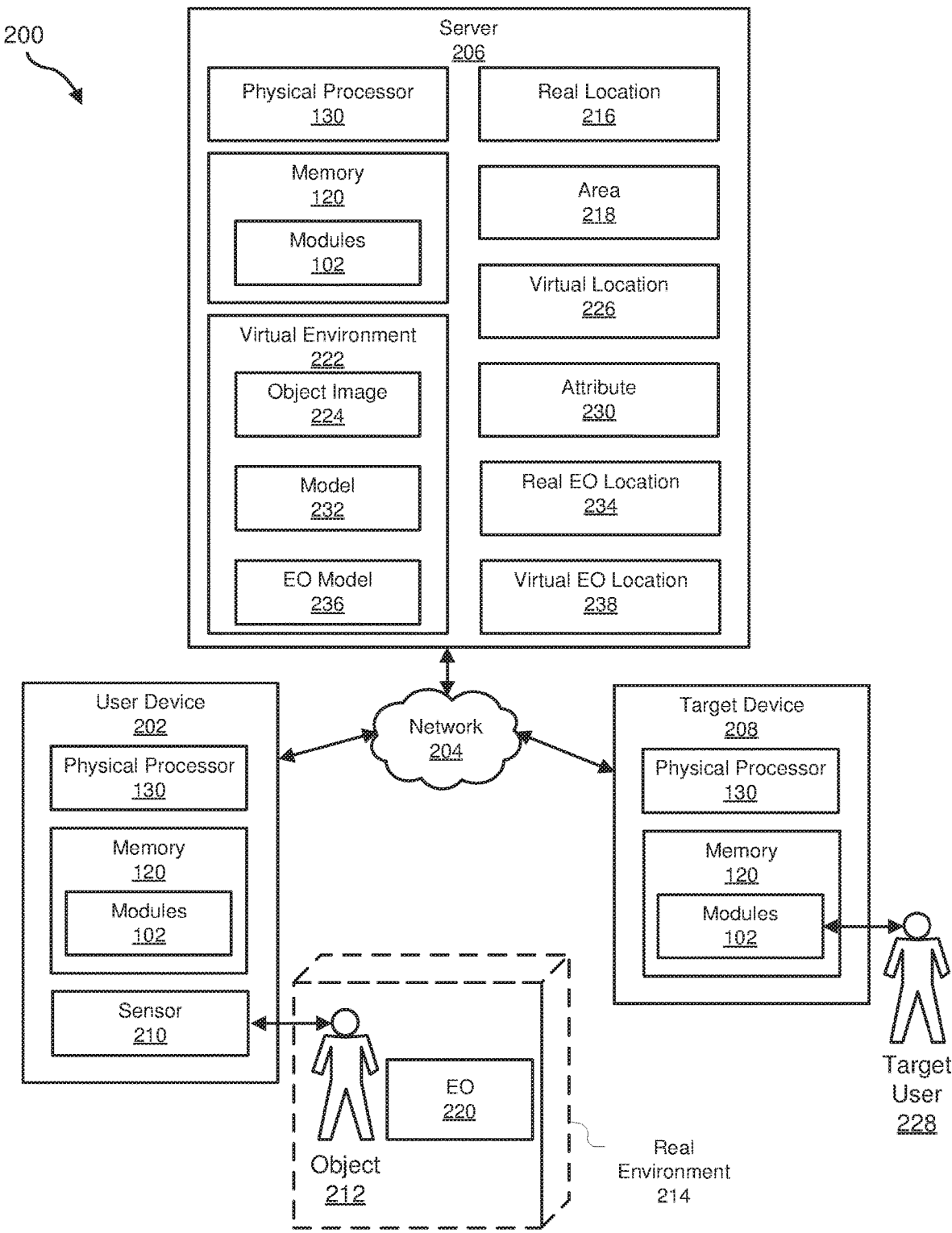
FIG. 2 is a block diagram of an example implementation of a system for generating and displaying artificial environments based on real-world environments.

Example system 100 in FIG. 1 may be implemented in a variety of ways. For example, all or a portion of example system 100 may represent portions of an example system 200 ("system 200") in FIG. 2. As shown in FIG. 2, system 200 may include user device 202 in communication with server 206 and target device 208 via network 204. In at least one example, user device 202 may be programmed with one or more of modules 102. Additionally or alternatively, server 206 and/or target device 208 may be programmed with one or more of modules 102.

In at least one embodiment, one or more modules 102 from FIG. 1 may, when executed by user device 202, server 206, and/or target device 208, enable user device 202, server 206, and/or target device 208 to perform one or more operations to generate and present artificial environments based on real-world environments. For example, as will be described in greater detail below, identifying module 104 may cause user device 202, server 206, and/or target device 208 to identify, via at least one sensor (e.g., sensor 210), an object of interest (e.g., object 212) located within a real-world environment (e.g., real environment 214). In some examples, identifying module 104 may cause user device 202, server 206, and/or target device 208 to identify the object of interest by determining a location of the object of interest (e.g., real location 216) within the real-world environment.

Furthermore, mapping module 106 may cause user device 202, server 206, and/or target device 208 to map an area of the real-world environment (e.g., area 218) surrounding the object of interest. In some examples, mapping module 106 may cause user device 202, server 206, and/or target device 208 to map the area of the real-world environment surrounding the object of interest by identifying an environmental object (e.g., environmental object 220, "EO 220" in FIG. 2) within the real-world environment surrounding the object of interest.

Additionally, generating module 108 may cause user device 202, server 206, and/or target device 208 to generate a virtual environment (e.g., virtual environment 222) based on the mapped area of the real-world environment surrounding the object of interest (e.g., area 218).

In some embodiments, displaying module 110 may cause user device 202, server 206, and/or target device 208 to display, in real-time, the object of interest within the virtual environment. In some examples, displaying module 110 may cause user device 202, server 206, and/or target device 208 to display, in real-time, the object of interest within the virtual environment by displaying a real-time video image of the object of interest (e.g., object image 224) within the virtual environment.

In some additional examples, displaying module 110 may cause user device 202, server 206, and/or target device 208 to display, in real-time, the object of interest within the virtual environment by (1) determining a location within the virtual environment (e.g., virtual location 226) that corresponds to the determined location of the object of interest within the real-world environment (e.g., real location 216), and (2) displaying the object of interest within the virtual environment at the determined location within the virtual environment that corresponds to the determined location of the object of interest within the real-world environment.

In at least some embodiments, the object of interest (e.g., object 212) may include at least a portion of a person. In such examples, displaying module 110 may cause user device 202, server 206, and/or target device 208 to display the object of interest (i.e., the portion of the person) within the virtual environment by displaying the portion of the person within the virtual environment to an additional person (e.g., target user 228). In such examples, identifying module 104 may identify the object of interest by identifying the person based on at least one attribute (e.g., attribute 230) of the person.

In some embodiments, the object of interest (e.g., object 212) may include a restricted access object. In such embodiments, displaying module 110 may cause user device 202, server 206, and/or target device 208 to display the object of interest within the virtual environment by displaying a model (e.g., model 232) that represents the restricted access object within the virtual environment. In some examples, the model may include at least one of (1) a security notification, or (2) a masking virtual object.

Additionally, in at least one embodiment, one or more of modules 102 (e.g., identifying module 104, mapping module 106, etc.) may cause user device 202, server 206, and/or target device 208 to identify the environmental object (e.g., environmental object 220) by determining a location of the environmental object within the real-world environment (e.g., real environmental object location 234, "real EO location 234" in FIG. 2). In such embodiments, generating module 108 may cause user device 202, server 206, and/or target device 208 to generate the virtual environment based on the mapped area of the real-world environment surrounding the object of interest by generating a model for use in the virtual environment that represents the environmental object (e.g., environmental object model 236, "EO model 236" in FIG. 2). Additionally, displaying module 110 may also cause user device 202, server 206, and/or target device 208 to display the object of interest within the virtual environment by displaying the model that represents the environmental object (e.g., environmental object model 236) within the virtual environment at a location within the virtual environment (e.g., virtual environmental object location 238, "virtual EO location 238" in FIG. 2) that corresponds to the location of the environmental object in the real-world environment (e.g., real environmental object location 234). In such embodiments, the environmental the environmental object may include a restricted access object, and the model (e.g., environmental object model 236) may include at least one of (1) a security notification, or (2) a masking virtual object.

User device 202 generally represents any type or form of computing device capable of reading and/or executing computer-executable instructions. In at least one embodiment, user device 202 may accept one or more directions from server 206 and/or target device 208. Examples of user device 202 include, without limitation, servers, desktops, laptops, tablets, cellular phones, (e.g., smartphones), personal digital assistants (PDAs), multimedia players, embedded systems, wearable devices (e.g., smart watches, smart glasses, etc.), gaming consoles, combinations of one or more of the same, or any other suitable mobile computing device.

Network 204 generally represents any medium or architecture capable of facilitating communication and/or data transfer between user device 202, server 206, and/or target device 208. Examples of network 204 include, without limitation, an intranet, a WAN, a LAN, a Personal Area Network (PAN), the Internet, Power Line Communications (PLC), a cellular network (e.g., a Global System for Mobile Communications (GSM) network, a code-division multiple access (CDMA) network, a Long-Term Evolution (LTE) network, etc.), universal serial bus (USB) connections, APPLE LIGHTNING connections, and the like. Network 204 may facilitate communication or data transfer using wireless or wired connections. In one embodiment, network 204 may facilitate communication between user device 202, server 206, and target device 208.

Server 206 generally represents any type or form of computing device capable of reading and/or executing computer-executable instructions and/or hosting executables. Examples of server 206 include, without limitation, application servers, storage servers, database servers, web servers, and/or any other suitable computing device configured to run certain software applications and/or provide various application, storage, and/or database services.

Like user device 202, target device 208 generally represents any type or form of computing device capable of reading and/or executing computer-executable instructions. In at least one embodiment, target device 208 may accept one or more directions from user device 202 and/or server 206. Examples of target device 208 include, without limitation, servers, laptops, tablets, cellular phones, (e.g., smartphones), personal digital assistants (PDAs), multimedia players, embedded systems, wearable devices (e.g., smart watches, smart glasses, etc.), gaming consoles, combinations of one or more of the same, or any other suitable mobile computing device. In at least one example, target device 208 may present (e.g., display via a display device included in target device 208) an object of interest (e.g., object 212) within a virtual environment (e.g., virtual environment 222) to target user 228.

In at least one example, user device 202, server 206, and target device 208 may be computing devices programmed with one or more of modules 102. All or a portion of the functionality of modules 102 may be performed by user device 202, server 206, target device 208, and/or any other suitable computing system. As will be described in greater detail below, one or more of modules 102 from FIG. 1 may, when executed by at least one processor of user device 202, server 206, and/or target device 208, may enable user device 202, server 206, and/or target device 208 to generate and display artificial environments based on real-world environments.

In some examples, user device 202 and/or target device 208 may be included as part of a mobile robot. In some examples, "robot" may refer to any form of mobile machine, programmable by a computer, capable of autonomously or semi-autonomously carrying out a complex series of actions or tasks. Examples of programmable mobile machines include, without limitation, robots, various aerial mobility systems (e.g., unmanned aerial vehicles), aquatic mobility systems (e.g., autonomous underwater or surface vehicles), and/or spacecraft mobility systems (e.g., unmanned spacecraft or probes) that are capable of omnidirectional movement on the ground, in the air, water, and/or space.

In at least one example, the mobile robot may include one or more features to facilitate telepresence by a remote user, and may, in such an example, be referred to as a "telepresence robot." In some examples, "telepresence" may refer to any technology which allows a person (e.g., a user, such as target user 228) to feel as if they are present, or to give an appearance of the user being present, at a location other than their true location.

Many other devices or subsystems may be connected to system 100 in FIG. 1 and/or system 200 in FIG. 2. Conversely, all of the components and devices illustrated in FIGS. 1 and 2 need not be present to practice the embodiments described and/or illustrated herein. The devices and subsystems referenced above may also be interconnected in different ways from those shown in FIG. 2. Systems 100 and 200 may also employ any number of software, firmware, and/or hardware configurations. For example, one or more of the example embodiments disclosed herein may be encoded as a computer program (also referred to as computer software, software applications, computer-readable instructions, and/or computer control logic) on a computer-readable medium.

Figure 3:
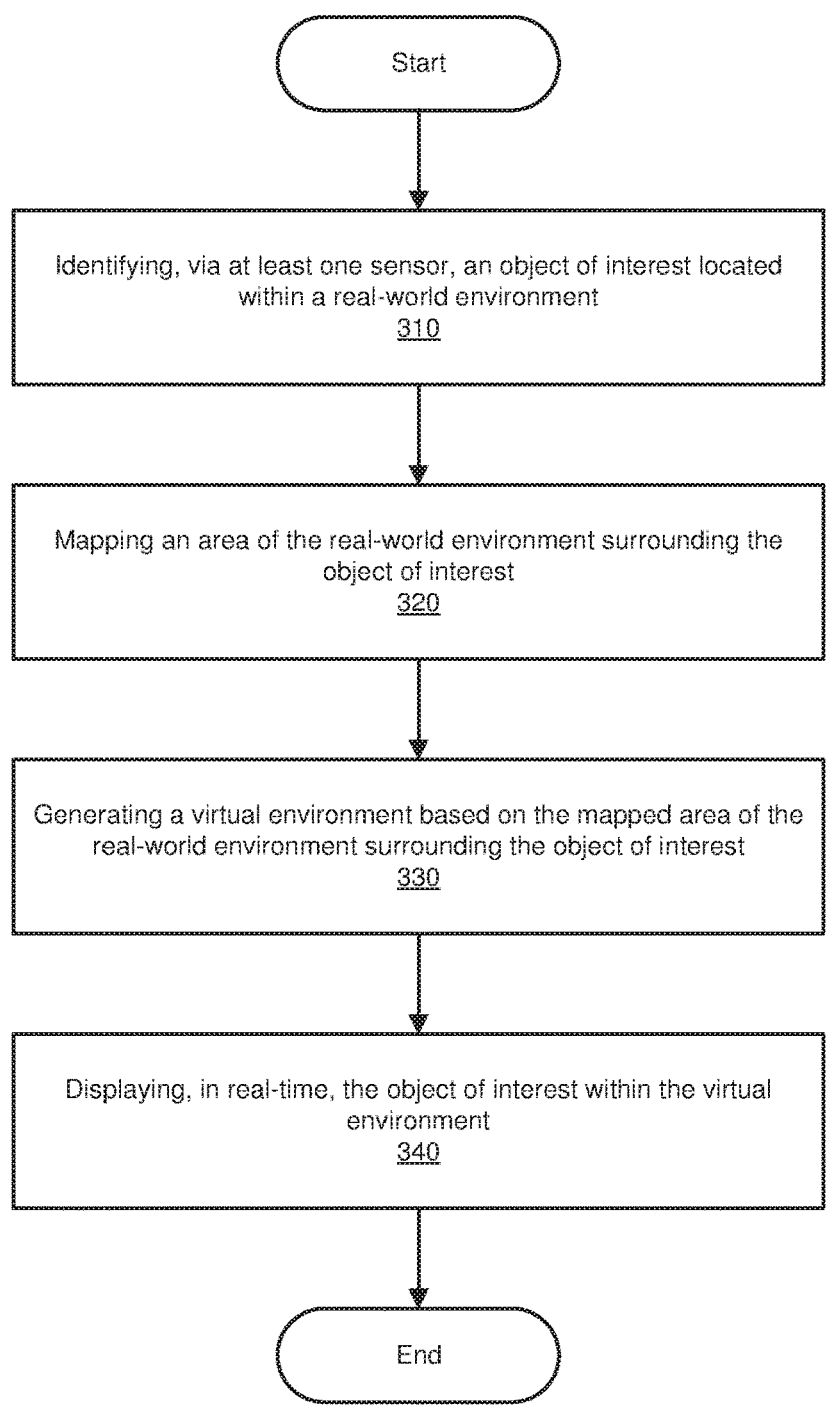
FIG. 3 is a flow diagram of an example method for generating and displaying artificial environments based on real-world environments.

FIG. 3 is a flow diagram of an example computer-implemented method 300 for allocating shared resources in multi-tenant environments. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 310, one or more of the systems described herein may identify, via at least one sensor, an object of interest located within a real-world environment. For example, identifying module 104 may, as part of user device 202, server 206, or target device 208 in FIG. 2, cause user device 202 to identify, via sensor 210, object 212 located within real environment 214.

Sensor 210 may include any suitable sensor that may identify (e.g., observe, view, locate, etc.) an object of interest located in a real-world environment. For example, sensor 210 may include, without limitation, a camera, a thermal camera, a proximity sensor, a depth sensor, a temperature sensor, an orientation sensor, an accelerometer, a radar sensor, a sonar sensor, a compass, a global positioning system (GPS) device, and so forth. As noted above in reference to FIG. 2, user device 202 and/or target device 208 may be included as part of a telepresence robot located in real environment 214. Hence, sensor 210 may also be included as part of a telepresence robot and, in some examples, sensor 210 may be a camera included in the telepresence robot located in real environment 214.

Object 212 may be any object that may exist within real environment 214 and that may be identified via sensor 210 including, without limitation, a person, a document, a structure, an article of clothing, a piece of furniture, a computer, a computer screen, portions of any of the foregoing, and so forth.

In some examples, object 212 may be a restricted access object. In at least one example, a "restricted access object" may be an object that is subject to one or more security policies. A "security policy" may include one or more rules or settings that, when enforced, protect sensitive data and/or resources located in a real-world environment from exposure to persons, systems, or organizations without permission to view and/or access the sensitive data and/or resources. In some examples, the sensitive data may be available on or accessible through end-user computing systems (e.g., user device 202, server 206, and/or target device 208), and a security policy may include any policy that may, when activated and enforced, directly and/or indirectly restrict user behavior on end-user computing systems. Examples of security policies include, without limitation, data-loss-prevention policies, access-control policies, antivirus policies, and endpoint-compliance policies.

Identifying module 104 may identify, via at least one sensor, an object of interest located within a real-world environment in a variety of contexts. For example, identifying module 104 may identify object 212 by determining a real location 216 of object 212 within real environment 214. Identifying module 104 may determine real location 216 of object 212 within real environment 214 in any suitable way. For example, as noted above, sensor 210 may include a variety of sensors that may collect data regarding a location of object 212 within real environment 214, such as a depth sensor, a radar sensor, a GPS device, and so forth. Identifying module 104 may receive data regarding a location of object 212 from sensor 210 and may analyze the received data in accordance with any suitable process or algorithm to determine real location 216 of object 212 within real environment 214.

In some examples, in addition to determining real location 216 of object 212 within real environment 214, one or more modules 102 (e.g., identifying module 104, mapping module 106, etc.), may determine and/or identify an attribute of object 212 (e.g., attribute 230) based on information received from sensor 210 including, without limitation, an identity, a size, an orientation, a color, a shape, a composition, a pattern, a heat signature, a position relative to sensor 210, a position relative to one or more environmental objects 220, a sound produced and/or reflected by object 212, a type and/or amount of light produced and/or reflected by environmental object 220, and so forth. In at least one embodiment, identifying module 104 may use any determined and/or identified attribute of object 212 to identify object 212.

For example, in some embodiments, object 212 may include at least a portion of a person. In such embodiments, identifying module 104 may identify object 212 by identifying the person. Identifying module 104 may identify the person in any suitable way. For example, identifying module 104 may identify the person based on at least one attribute of the person (e.g., attribute 230). In some examples, the attribute of the person may include any suitable biometric attribute of the person. A "biometric attribute" may include any distinctive and/or measurable characteristic of a person that may be used to identify the person. Examples of biometric attributes include, without limitation, fingerprints, palm vein patterns, facial features, DNA sequences, palm prints, hand geometry, iris patterns, retina blood vessel patterns, odor and/or scent profiles, typing rhythms, speaking rhythms, gaits, postures, and/or voice patterns.

By way of illustration, sensor 210 may include a camera, and identifying module 104 may obtain an image of the person via the camera included in sensor 210. Identifying module 104 may then use any suitable facial recognition algorithm (e.g., a geometric and/or photometric facial recognition algorithm) to analyze the obtained image of the person. Identifying module 104 may thus identify the person included in object 212 based on an attribute (e.g., a face, a facial feature, and/or a set of facial features) of the person.

In other examples, the attribute of the person (e.g., attribute 230) may include an identifying token associated with the person. The identifying token may be any suitable identifier that may be associated with a person. For example, an entity (e.g., an employer, a government entity, etc.) may provide the person with an identifier (e.g., an identification card, an identification badge, etc.) that includes a radio-frequency identification (RFID) device. Sensor 210 may include a suitable RFID reader that may read the RFID device included in the person's identifier. Identifying module 104 may thereby receive identifying information regarding the person from the RFID via sensor 210, and may thus identify the person based on the received identifying information.

As another example, the provided identifier (and thus attribute 230) may include an optically readable symbol that may identify the person. For example, the provided identifier (e.g., the person's identification badge) may include an optically readable barcode (e.g., a linear barcode, a matrix code, etc.) associated with the person. Sensor 210 may obtain an image of object 212 that includes the optically readable barcode e.g., an image of the person that includes the optically readable barcode). Identifying module 104 may receive the image from sensor 210, and may analyze the image to identify the person. As part of analyzing the received image, identifying module 104 may identify and/or read the optically readable barcode, and determine that the optically readable barcode may be associated with the person. Thus, identifying module 104 may identify the person based on the optically readable barcode.

Returning to FIG. 3, at step 320, one or more of the systems described herein may map an area of the real-world environment surrounding an object of interest. For example, mapping module 106 may, as part of user device 202, server 206, or target device 208 in FIG. 2, map area 218 of real environment 214 surrounding object 212.

Mapping module 106 may map an area of a real-world environment surrounding an object of interest in a variety of contexts. For example, mapping module 106 may map area 218 surrounding object 212 by identifying an environmental object (e.g., environmental object 220) within real environment 214. Like object 212, an environmental object (e.g., environmental object 220) may be any object located within real environment 214 and that may be identified via sensor 210. For example, environmental object 220 may include, without limitation, a person, a document, a structure, an article of clothing, a computer, a computer screen, a piece of furniture, and/or portions or combinations of any of the foregoing. In at least some embodiments, environmental object 220 may be distinct (e.g., physically distinct, logically distinct, semantically distinct, etc.) from object 212. Also like object 212, in some examples, environmental object 220 may also be a restricted access object.

Mapping module 106 may identify environmental object 220 in any suitable way. For example, mapping module 106 may determine and/or identify one or more attributes of environmental object 220 based on information received from sensor 210, and may identify environmental object 220 based on the one or more determined and/or identified attributes of environmental object 220.

For example, mapping module 106 may identify environmental object 220 by determining a location of environmental object 220 in real environment 214 (e.g., real environmental object location 234). Mapping module 106 may determine real environmental object location 234 of environmental object 220 within real environment 214 in any suitable way. For example, as noted above, sensor 210 may include a variety of sensors that may collect data regarding a location of environmental object 220 within real environment 214. Mapping module 106 may receive data regarding a location of environmental object 220 from sensor 210 and may analyze the received data in accordance with any suitable algorithm to determine real environmental object location 234 of environmental object 220 within real environment 214.

In additional examples, mapping module 106 may determine additional attributes of environmental object 220 based on information received from sensor 210 including, without limitation, an identity, a size, an orientation, a color, a shape, a composition, a pattern, a heat signature, a position relative to object 212, a position relative to sensor 210, a position relative to one or more other environmental objects 220, a sound produced by environmental object 220, a type and/or amount of light reflected by environmental object 220, and so forth. Mapping module 106 may use any determined attribute of environmental object 220 to identify environmental object 220.

Additionally, mapping module 106 may access data representative of a predefined layout of real environment 214, and may map area 218 surrounding object 212 by analyzing the accessed data representative of the predefined layout of real environment 214. For example, the data representative of a predefined layout of real environment 214 may include data representative of a floorplan of a structure (e.g., a building, an office, a home, etc.) included in real environment 214. Mapping module 106 may map area 218 surrounding object 212 by accessing the data representative of the floorplan, and thus may identify and/or determine attributes (e.g., locations within real environment 214, sizes, orientations, compositions, visual appearances, etc.) of various environmental objects 220 (e.g., walls, doors, furniture items, etc.) located within real environment 214.

By identifying an object of interest located within a real-world environment and mapping an area of the real-world environment surrounding the object of interest, the systems and methods described herein may gather data regarding attributes and relative locations of objects located within the real-world environment (e.g., real environment 214). The systems and methods described herein may then use this gathered data to generate a virtual environment that may represent the real-world environment, and may display the object of interest within the virtual environment.

Figure 4:
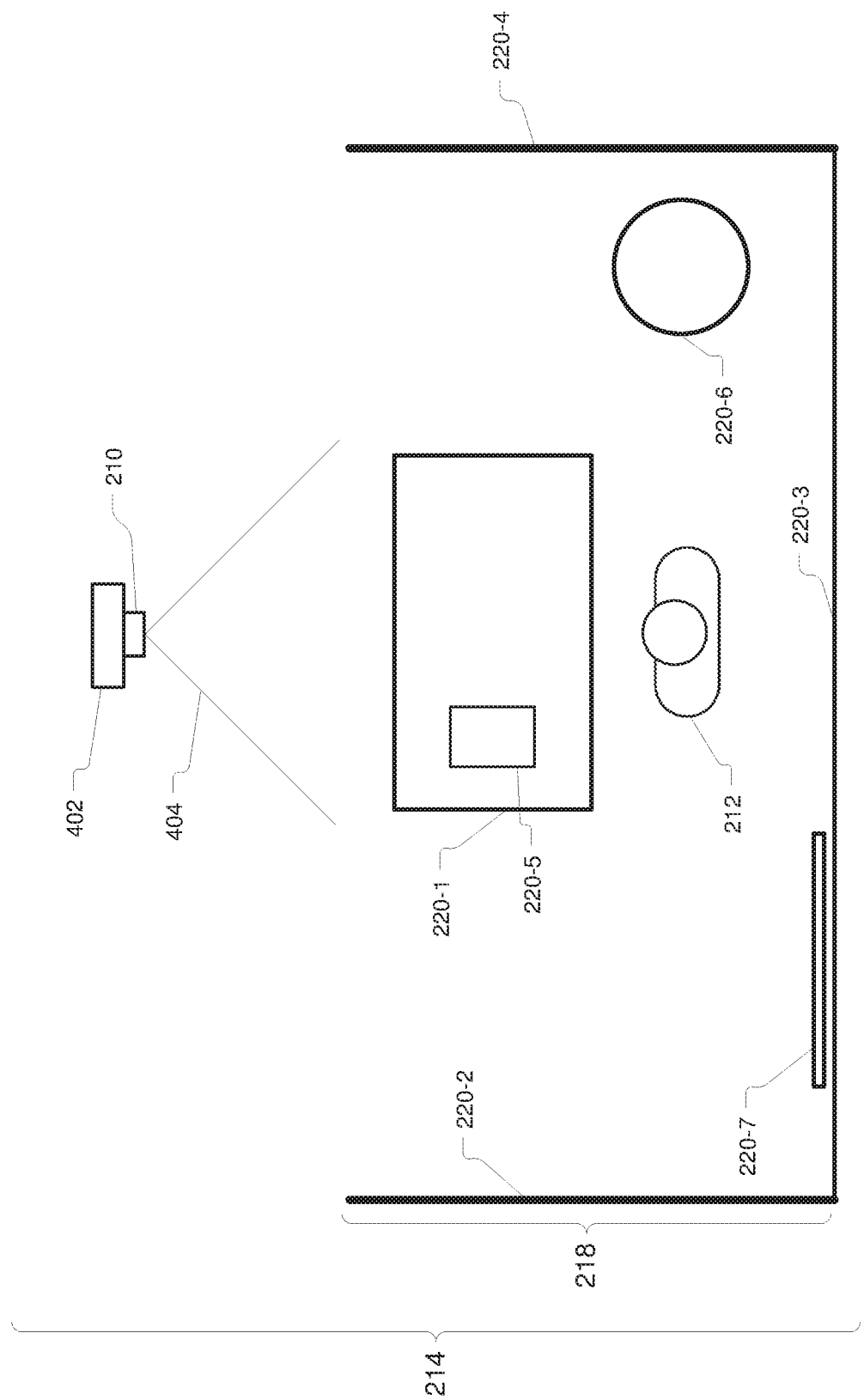
FIG. 4 is an overhead view of a telepresence robot located in a real-world environment.
Figure 5:
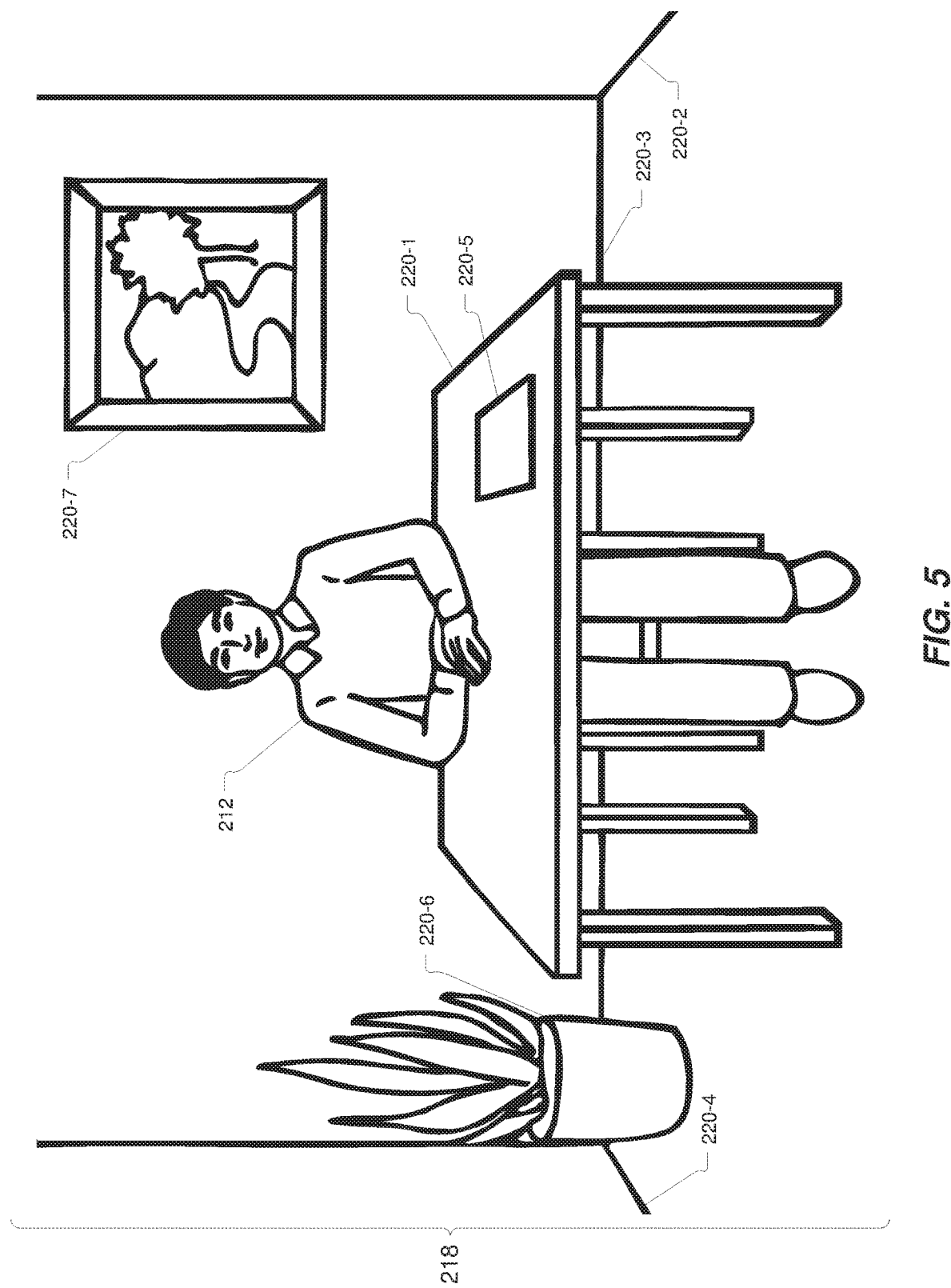
FIG. 5 illustrates identifying, via at least one sensor, an object of interest located in a real-world environment, as well as identifying one or more environmental objects located in the real-world environment.

By way of illustration, FIG. 4 shows an overhead view of a telepresence robot 402 located in real environment 214. Telepresence robot 402 may be an implementation of a user device 202, and as such, may include a sensor 210. Sensor 210 may be a camera with an area of view 404 that may include an area 218 surrounding an object 212. As shown, area 218 includes object 212 as well as various environmental objects 220 (e.g., environmental objects 220-1 through 220-77). FIG. 5 shows an example image of an area 218 of real environment 214 that may be obtained by telepresence robot 402 via a camera included in sensor 210. As shown, object 212 is a portion (e.g., a head, upper torso, arms, and legs) of a person, and environmental objects 220 include a variety of objects located in an area 218 surrounding object 212, such as a desk (i.e., environmental object 220-1), three walls (i.e., environmental objects 220-2 through 220-4), a document sitting upon the desk (i.e., environmental object 220-5), a plant (i.e., environmental object 220-6), and a picture hanging on one of the walls (i.e., environmental object 220-7). Identifying module 104 may identify object 212 as being an object of interest and determine a real location 216 in real environment 214 of object 212, and mapping module 106 may map the area surrounding object 212 by identifying environmental objects 220 and determining real environmental object locations 234 of environmental objects 220.

Returning to FIG. 3, at step 330, one or more of the systems described herein may generate a virtual environment based on a mapped area of a real-world environment surrounding an object of interest. For example, generating module 108 may, as part of user device 202, server 206, or target device 208 in FIG. 2, generate virtual environment 222 based on area 218 of real environment 214 surrounding object 212.

In some examples, a "virtual environment" or "artificial environment" may include any computer-generated environment including, without limitation, a two-dimensional environment, a three-dimensional environment, a virtual reality environment, an augmented reality environment, an artificial reality environment, a combination of one or more of the foregoing, and so forth. In some examples, a virtual environment may include a two- or three-dimensional representation of a real-world environment (e.g., real environment 214).

Generating module 108 may generate a virtual environment based on a mapped area of a real-world environment surrounding an object of interest in a variety of contexts. For example, generating module 108 may generate a virtual environment 222 based on area 218 of real environment 214 surrounding object 212 by generating a model (e.g., environmental object model 236) for use in a virtual environment (e.g., virtual environment 222) that represents an identified environmental object (e.g., environmental object 220) within the virtual environment.

An environmental object model may represent an environmental object (e.g., environmental object 220) in a variety of ways. For example, an environmental object model may resemble an actual appearance of an environmental object, may have similar dimensions to the environmental object, may have a similar orientation to the environmental object, and so forth.

Generating module 108 may generate an environmental object model for use in the virtual environment in any suitable way. For example, sensor 210 may obtain various data regarding environmental object 220 (e.g., size, color, orientation, position relative to sensor 210, and so forth). Generating module 108 may receive the data regarding environmental object 220 (e.g., from sensor 210, from any of modules 102, etc.), and may analyze the data to determine one or more attributes of environmental object 220. Generating module 108 may then generate virtual environment 222 based on the determined attributes of environmental object 220 by dynamically generating an environmental object model that shares one or more of the determined attributes of environmental object 220.

By way of illustration, returning to FIG. 5, mapping module 106 may map an area 218 of real environment 214 by identifying and/or determining a location within real environment 214 of environmental object 220-1. For example, if environmental object 220-1 is located at a particular location within real environment 214 (e.g., a real environmental object location 234), generating module 108 may generate a model for virtual environment 222 that is located at a location within virtual environment 222 that corresponds to the determined location of environmental object 220-1 (e.g., virtual environmental object location 238).

Figure 6:
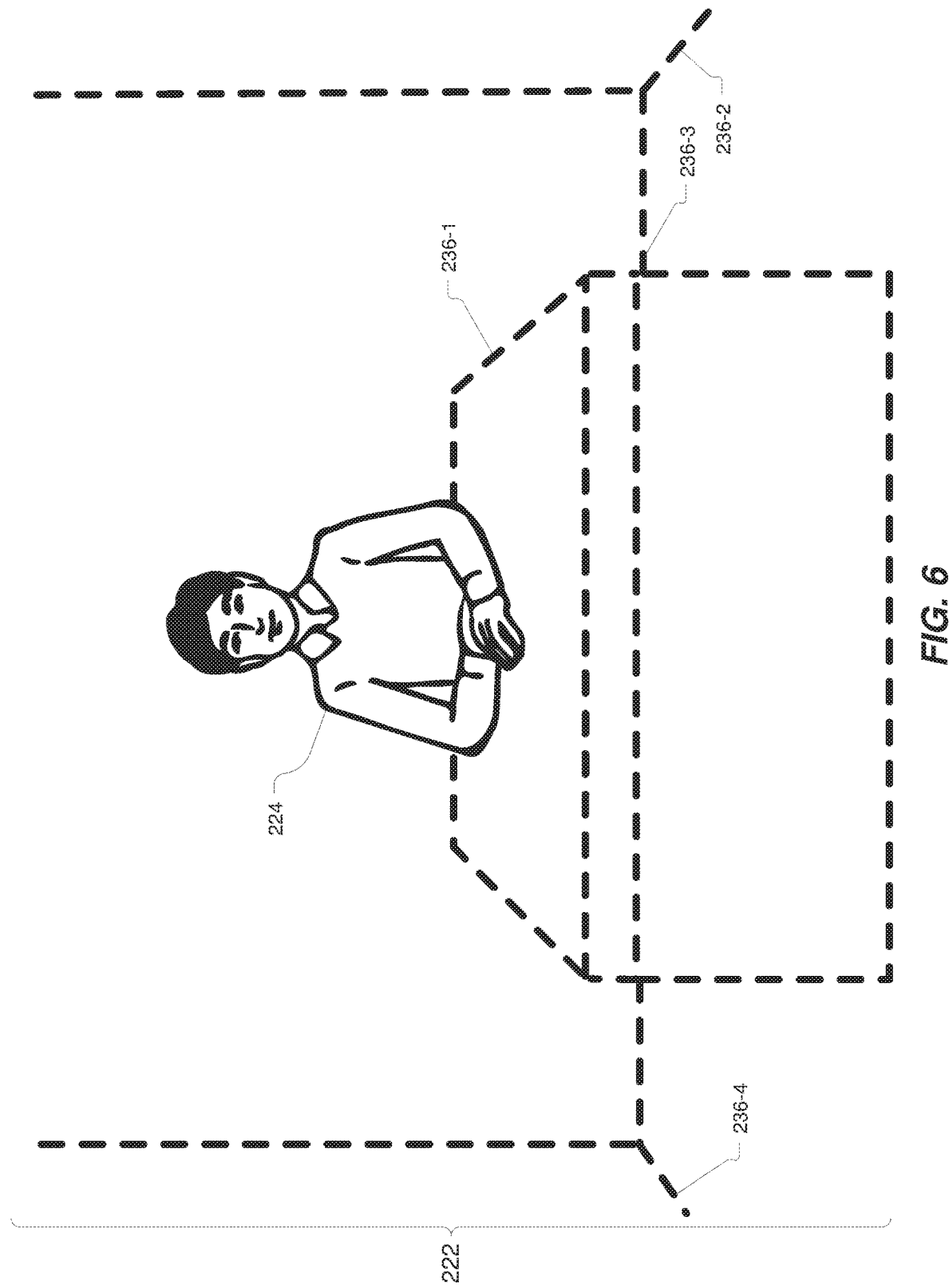
FIG. 6 illustrates displaying, in real-time, an identified object of interest within a generated virtual environment.

Furthermore, in addition to receiving data regarding a location of environmental object 220-1 within real environment 214, generating module 108 may receive data regarding one or more attributes of environmental object 220-1 (e.g., from sensor 210, from one or more of modules 102, etc.), such as a size of environmental object 220-1, an orientation of environmental object 220-1, a composition of environmental object 220-1, and so forth. Based on this information, generating module 108 may generate (e.g., dynamically generate) a model for use in virtual environment 222 that represents environmental object 220-1 (e.g., an environmental object model 236-1 as shown in FIG. 6) by generating a model that shares one or more attributes with environmental object 220-1. For example, as will be described in greater detail below, environmental object model 236-1 shown in FIG. 6 has a similar orientation to and similar dimensions (e.g., length, width, height, etc.) to environmental object 220-1.

In some additional examples, generating module 108 may generate an environmental object model for use in the virtual environment that represents an environmental object by accessing a database of pre-rendered models that may be used within virtual environment 222, and selecting a pre-rendered model from the database of pre-rendered models as the environmental object model based on at least one attribute of the environmental object. This process may simplify and/or improve an efficiency of the generation of virtual environment 222 by generating module 108.

For example, as shown in FIG. 5, environmental object 220-1 may be a desk. One or more of modules 102 (e.g., identifying module 104, mapping module 106, generating module 108, etc.) may identify environmental object 220-11 as a desk based on a location of environmental object 220-1 within real environment 214, a size, orientation, composition, or any other attribute of environmental object 220-1. Rather than, or in addition to, dynamically generating a model to represent environmental object 220-11 within virtual environment 222, generating module 108 may access a database of pre-rendered models that may be used within virtual environment 222, and may select a pre-rendered model (e.g., a pre-rendered model of a desk) from the database to represent environmental object 220-1 within virtual environment 222. In some examples, generating module 108 may alter a selected pre-rendered model, such as by scaling, rotating, and/or coloring the selected pre-rendered model, to improve the representation of environmental object 220 by the selected pre-rendered model.

In at least one example, environmental object 220 may include a restricted access object. As will be described in greater detail below in reference to FIG. 8, when environmental object 220 includes a restricted access object, generating module 108 may generate a model to represent the restricted access object in virtual environment 222 that includes a security notification or a masking virtual object. In some examples, a "security notification" may be a notification that notifies a user viewing virtual environment 222 (e.g., target user 228) that the restricted access object may be subject to one or more security policies and/or that the user may not have permission view the restricted access object. In other examples, a "masking virtual object" may be any model that may be included in a virtual environment (e.g., virtual environment 222) that may mask a restricted access object from a view of a user viewing the virtual environment, such that the viewer is prevented from viewing the restricted access object via the virtual environment. Additional examples and illustrations of security notifications and masking virtual objects will be provided below in reference to FIG. 8.

Returning to FIG. 3, at step 340, one or more of the systems described herein may display, in real-time, an object of interest within a virtual environment. For example, displaying module 110 may, as part of user device 202, server 206, or target device 208 in FIG. 2, display, in real-time, object 212 within virtual environment 222.

Displaying module 110 may display, in real-time, an object of interest within a virtual environment in a variety of contexts. For example, as described above, identifying module 104 may identify object 212 in real environment 214 by determining real location 216 of object 212 within real environment 214. Displaying module 110 may then determine a location within the virtual environment that corresponds to the determined location of the object of interest within the real-world environment (e.g., virtual location 226), and display the object of interest within the virtual environment at the determined location within the virtual environment that corresponds to the determined location of the object of interest within the real-world environment (e.g., virtual location 226). In at least one example, displaying module 110 may display the object of interest (e.g., object 212) within a virtual environment (e.g., virtual environment 222) by displaying a real-time video image of object 212 within the virtual environment.

In some examples, as described above, the object of interest may include a portion of a person. Therefore, in such examples, displaying module 110 may display the portion of the person within the virtual environment (e.g., virtual environment 222).

In at least one example, displaying module 110 may display the portion of the person within the virtual environment to an additional person (e.g., target user 228). For example, displaying module 110 may display the object of interest (e.g., object 212) within the virtual environment (e.g., virtual environment 222) by displaying the virtual environment via a suitable communications application, such as video conferencing application, an augmented reality environment, or a virtual reality environment, to an additional person (e.g., target user 228). The communications application may be executedexecuted on and/or may be accessible through a suitable computing device (e.g., target device 208). The computing device (e.g., target device 208) may include a suitable display device that displaying module 110 may use to display object 212 within virtual environment 222. Thus, displaying module 110 may display object 212 (e.g., at least a portion of a person) to an additional person (e.g., target user 228).

By way of illustration, FIG. 6 shows a view of a virtual environment 222 with an object image 224 (e.g., a real-time video image) of object 212 that includes a portion of a person at a location within virtual environment 222 that corresponds to the location of object 212 within real environment 214. Furthermore, FIG. 6 also shows a virtual environment 222 that includes several environmental object models 236 (e.g., environmental object modelsmodels 236-1 through 236-44) that correspond to various environmental objects 220 located in area 218 of real environment 214 as shown in FIG. 5. For example, environmental object model 236-1 may correspond to environmental object 220-1, environmental object model 236-2 may correspond to environmental object 220-2, and so forth.

As illustrated by FIGS. 5 and 6, modules 102 (e.g., identifying module 104, mapping module 106, etc.) may identify and/or determine real location 216 of object 212 in real environment 214, may map area 218 of real environment 214 by identifying and/or determining locations of environmental objects 220 within real environment 214, may generate virtual environment 222 by generating (e.g., dynamically generating, selecting, and/or positioning) environmental object models 236 (e.g., environmental object models 236-1 through 236-44) that correspond to environmental objects 220 at locations within virtual environment 222 that correspond to the determined locations of environmental objects 220 within real environment 214. One or more of modules 102 may also display, in real time, object 212 within virtual environment 222 by displaying object image 224 of object 212 within virtual environment 222 at a location within virtual environment 222 that corresponds to the location within real environment 214 of object 212 (e.g., virtual location 226).

As may be apparent from FIGS. 5 and 6, virtual environment 222 may resemble area 218 of real environment 214, with object image 224 of object 212 displayed at a location within virtual environment 222 that may correspond to the location of object 212 within real environment 214, and environmental object models 236-1 through 236236-4 displayed at locations within virtual environment 222 that may correspond to environmental objects 220-1 through 220-4. However, in some examples, one or more of modules 102 (e.g., identifying module 104, mapping module 106, etc.) may obscure some environmental objects located in real environment 214 by omitting environmental models that represent those environmental objects from virtual environment 222 and/or by including environmental objects that obscure those environmental objects from a view of an additional user (e.g., target user 228) of virtual environment 222.

For example, as shown in FIG. 6, virtual environment 222 may not include environmental object models that correspond to environmental objects 220-5 through 220-7. Additionally or alternatively, environmental object model 236-1 may be a model of a desk that may be shown simultaneously with (e.g., optically and/or digitally composited with) object image 224 of the person included in object 212 such that environmental object model 236-1 may obscure a portion (e.g., the legs and lower torso) of the person included in object 212. Thus, displaying module 110 may cause target user 228 to be unaware of the existence of and/or of a true appearance of the obscured portion of object 212 and/or environmental objects 220-5 through 220-7 when target user 228 views object 212 within virtual environment 222. This may serve to maintain desired privacy of a person included in object 212 when communicating with target user 228 via a video conferencing application, an augmented reality environment, and/or a virtual reality environment.

Additionally, in some embodiments, the object of interest (e.g., object 212) and/or an environmental object (e.g., environmental object 220) within the real-world environment (e.g., real environment 214) may include a restricted access object. In such embodiments, displaying module 110 may display a model of the object of interest (e.g., model 232) and/or a model of the environmental object (e.g., environmental object model 236) that includes at least one of a security notification or a masking virtual object.

Figure 7:
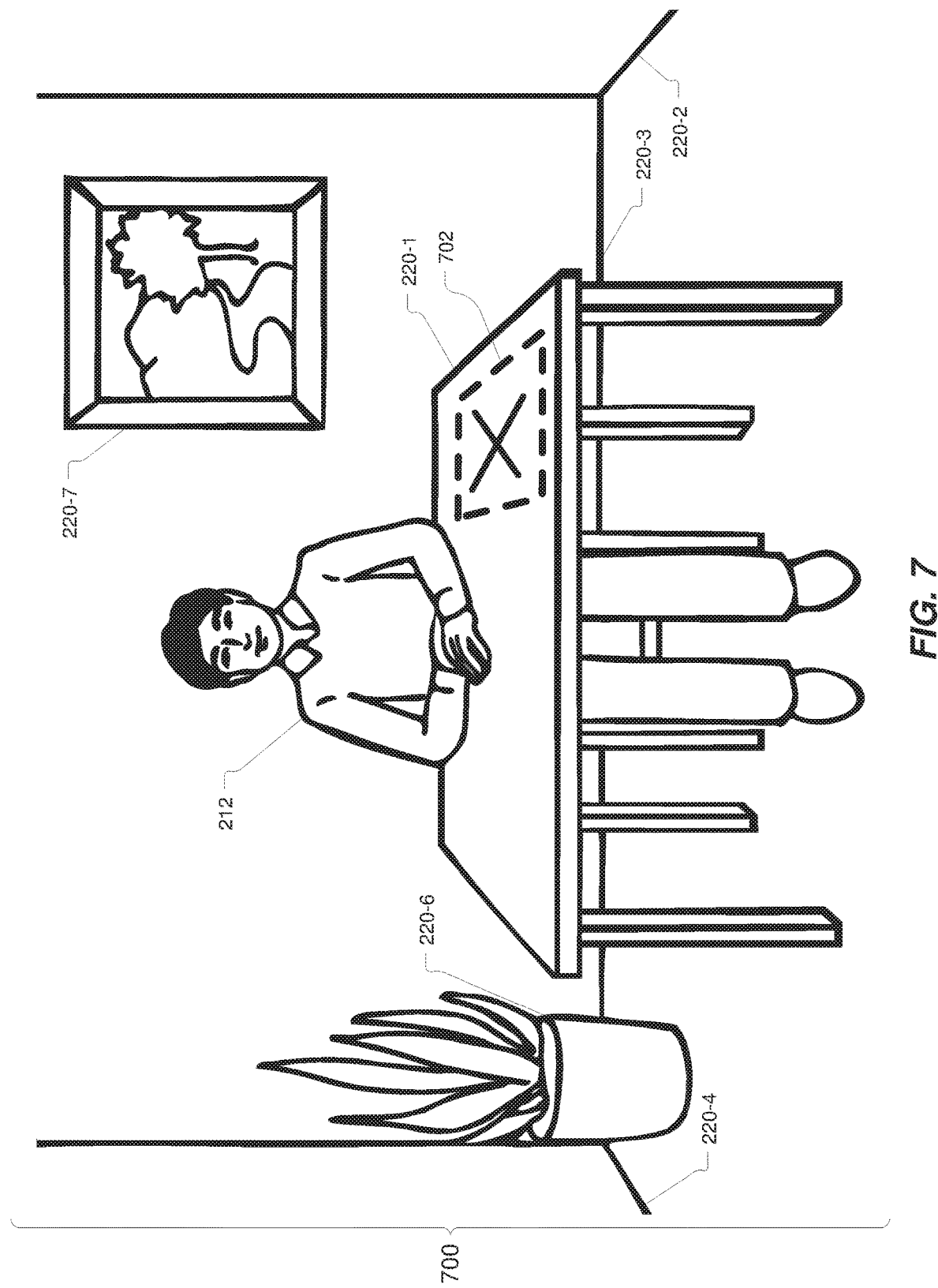
FIG. 7 illustrates identifying a restricted access object and displaying a masking virtual object within the virtual environment that masks the restricted access object from a view of an additional person.

By way of illustration, FIG. 7 shows an alternative virtual environment 700 that displaying module 110 may present to an additional person such as target user 228. Virtual environment 700 may include some or all of environmental object models 236 included in virtual environment 222 from FIG. 6. However, displaying module 110 may display the environmental object models included in FIG. 6 as an at least partially transparent layer logically and/or graphically superimposed over (e.g., composited with) a video image obtained by sensor 210 of object 212 and/or of area 218 of real environment 214.

The video image that virtual environment 700 may be transparently and/or logically superimposed over (e.g., composited with) may show some or all of environmental objects 220 from FIG. 5 (e.g., environmental objects 220-1 through 220-7). In the example illustrated by FIG. 7, one or more of modules 102 may identify and/or determine that environmental object 220-5 may be a restricted access object, such as a secure, protected, and/or restricted document that target user 228 may not have permission to view.

Displaying module 110 may therefore display environmental object 220-5 within alternative virtual environment 700 as restricted access object 702. Restricted access object 702 may be located, positioned, and/or oriented within virtual environment 700 to appear as if it is laying on top of environmental object 220-1 (e.g., on top of a desk located in real environment 214) in place of and/or virtually on top of environmental object 220-5. This may result in restricted access object 702 at least partially obscuring environmental object 220-5 when a person (e.g., target user 228) views alternative virtual environment 700 via a suitable video conferencing application, virtual reality environment, and/or alternative reality environment.

In an additional example, at least one person (e.g., a person, a group of people, etc.) may be located within area 218 of real environment 214. At least one of modules 102 (e.g., identifying module 104, mapping module 106, etc.) may identify the person in any of the ways described herein (e.g., via a biometric attribute, via an identifying token, etc.), and may determine that the person may represent a restricted access object subject to a security policy that prevents target user 228 from viewing the person as part of virtual environment 228. For example, the person may not desire to be viewed by target user 228 as part of virtual environment 222, displaying the person as part of virtual environment 222 to target user 228 may present security concerns, and so forth.

One or more of modules 102 (e.g., mapping module 106, generating module 108, etc.) may therefore omit a model (e.g., a model 232, an environmental object model 236, etc.) from virtual environment 222 that represents the person within virtual environment 222. Additionally or alternatively, one or more of modules 102 (e.g., generating module 108, displaying module 110, etc.) may generate and/or display a model (e.g., a model 232, an environmental object model 236, etc.) that corresponds to the person within virtual environment 222 that does not include any identifying information regarding the person (e.g., a generic model that represents a generic person, such as a generic avatar).

Additionally or alternatively, one or more of modules 102 (e.g., displaying module 110) may display a masking virtual object that obscures the person from the view of target user 228 when target user 228 views virtual environment 222. One or more of modules 102 may take any other additional or alternative action to avoid presenting the person to target user 228 when target user 228 views the virtual environment via a suitable video conferencing application, virtual reality environment, and/or alternative reality environment.

Hence, embodiments of the systems and methods described herein may ensure that the privacy of restricted access objects—including people—may be maintained when a user (e.g., target user 228) remotely views and/or interacts with people and/or objects within real environment 214.

In some embodiments, as described above, one or more of modules 102 (e.g., identifying module 104, mapping module 106, etc.) may identify a person included in object 212 based on at least one attribute (e.g., a biometric attribute, an identifying token associated with the person, etc.). In such embodiments, displaying module 110 may present a notification to the additional person (e.g., target user 228 that may be viewing object 212 within virtual environment 222) that includes an indication of the identity of the person. The notification may include any suitable information that may serve to identify a person.

Figure 8:
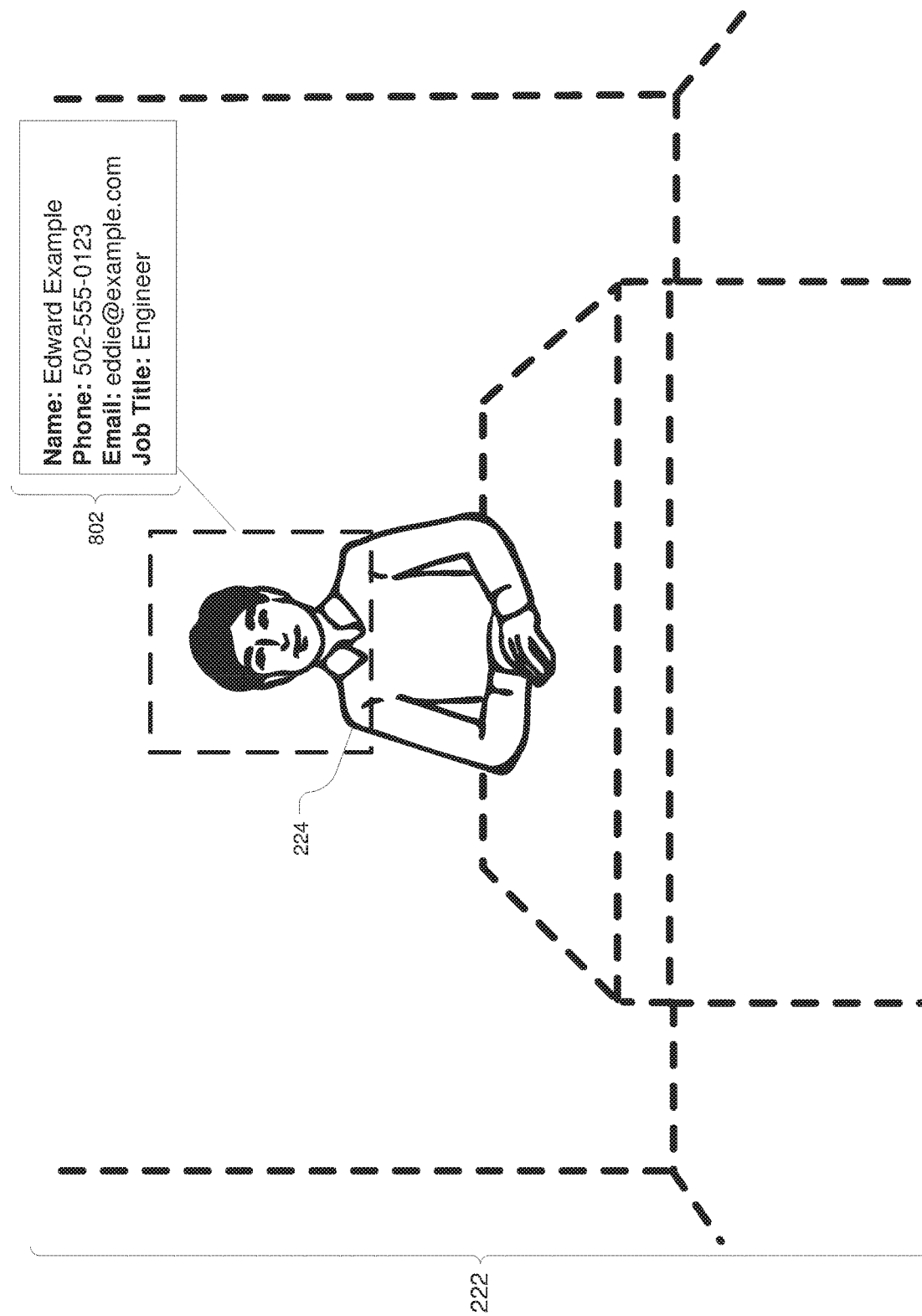
FIG. 8 illustrates identifying a person based on at least one attribute of the person, and presenting a notification, within the virtual environment, to an additional person that includes an indication of the identity of the person.

By way of illustration, FIG. 8 shows virtual environment 222 as shown in FIG. 6, with the addition of a notification 802 that identifies a person included in object 212. As shown, identifying module 104 has identified object 212 as including at least a portion of a person, and has further identified the person as a person named Edward Example. Displaying module 110 may therefore present notification 802 to target user 228 when target user 228 views object 212 within virtual environment 222 via a suitable communication application. As shown, notification 802 includes a name of the identified person (e.g., "Edward Example"), a phone number of the identified person (e.g., "502-555-0123"), an email address of the identified person (e.g., "eddie@example.com"), and a job title of the identified person ((e.g., "Engineer"). The information included in notification 802 is exemplary only, as a notification may include any suitable information related to an identified person.

Such a display of identifying information may be particularly useful when a target user (e.g., target user 228) views object 212 within virtual environment 222 via a telepresence robot. For example, target user 228 may navigate a telepresence robot (e.g., a telepresence robot that includes user device 202) through real environment 214, and may view environment 214 via a real-time video feed provided by a camera included in sensor 210. When the telepresence robot encounters a person within real environment 214, an embodiment of the instant disclosure may identify the person (e.g., as part of object 212), map an area that surrounds the person, generate a virtual environment based on the mapped area, and display the person in real-time within the virtual environment along with a notification that may indicate an identity of the person to target user 228. This may help target user 228 to identify and/or locate a person in the real-world environment that target user 228 wishes to interact with.

Additionally, at least one embodiment of the instant disclosure may alter or augment an appearance of area 218 in any other suitable way. For example, while real environment 214 may be an office, a home, a business, and so forth, one or more modules 102 (e.g., generating module 108, displaying module 110, etc.) may alter an appearance of real environment 214 by including environmental objects 236 in virtual environment 222 that cause virtual environment 222 to resemble a castle, a classroom, an outdoor area, and/or any other environment rather than real environment 214.

To illustrate, target user 228 may use a telepresence robot (e.g., a telepresence robot that includes user device 202) to remotely navigate through an office. An embodiment of the systems and methods described herein may generate and display to target user 228 a virtual environment, based on a mapping of the area of the office in proximity to the telepresence robot, that has a similar layout to the office through which the telepresence robot is traveling. However, the embodiment may generate the virtual environment such that the virtual environment may have an appearance of a castle, a classroom, an outdoor area, and/or any other environment that may differ from a real appearance of the office. In addition to the privacy and/or security benefits described herein, such an embodiment may provide an entertaining and/or enjoyable method of remotely viewing and/or interacting with a real-world environment via a telepresence robot.

As discussed throughout the instant disclosure, the disclosed systems and methods may provide one or more advantages over traditional options for generating and displaying real-world environments to remote users. For example, by identifying an object of interest located within a real-world environment and mapping an area of the real-world environment surrounding the object of interest, the systems and methods described herein may gather data regarding attributes and relative locations of objects located within the real-world environment (e.g., real environment 214). Generating and displaying a virtual representation of the real-world environment based on that gathered data may provide an automatic pivot from a virtual representation of an object of interest into a rich representation of the object of interest that more closely resembles a real-world appearance of the object of interest, all while maintaining desired personal privacy, addressing potential security concerns, and conserving computing resources.

For example, as described above in reference to FIG. 8, a remote viewer (e.g., target user 228) may navigate a telepresence robot (e.g., telepresence robot 402) through a real-world environment (e.g., real environment 214). The systems and methods described herein may allow the remote viewer to navigate the telepresence robot through the real-world environment by viewing and/or interacting with a virtual environment that represents the real-world environment. In some contexts, this may be preferable to viewing and/or interacting with the real-world environment via a traditional video stream from the telepresence robot to the remote, such as during periods of constrained bandwidth or when the telepresence robot may be navigating through a real-world location that includes one or more secure documents, areas, people, and so forth.

As the remote viewer navigates the telepresence robot through the real-world environment via a view of a generated virtual environment, the remote viewer may identify a person located in the real-world environment that the remote viewer may wish to engage in a rich conversation with (e.g., via a video conferencing application, an augmented reality environment, and/or a virtual reality environment). When the telepresence robot encounters the person that the remote viewer may wish to interact with, an embodiment of the instant disclosure may (1) identify the person as an object of interest, (2) map an area of the real environment 214 surrounding the person, (3) generate a virtual environment based on the mapped area, and (4) display the person within the virtual environment. The remote viewer may then interact with the person displayed within the virtual environment. This may provide a rich, face-to-face interaction between the remote viewer and the person located in the real-world environment, while omitting and/or obscuring extraneous, restricted, distracting, or otherwise undesired details of the real-world environment (e.g., walls, doors, desks, etc.) from the displayed virtual environment.

Thus, embodiments of the instant disclosure may provide rich and engaging ways for users to interact with each other that protect privacy (e.g., user privacy, organizational privacy, etc.), address security concerns that may be raised by new forms of interaction (e.g., mobile and/or telepresence robots capable of autonomously or heteronomously moving through and gathering data about a real-world environment), and that may conserve computing resources (e.g., bandwidth resources, processing resources, memory resources, and so forth).

Finally, embodiments of the instant disclosure may be applied within any communications application where a real-world environment may be represented by generated virtual environmentsenvironments including, without limitation, video conferencing applications, virtual reality environments, and augmented reality environments. These systems and methods may therefore serve to enhance and/or improve many different communications methodologies and/or systems, and thus provide users with rich and useful communication experiences.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive sensor data to be transformed, transform the sensor data to generate a virtual environment that represents a real-world environment, output a result of the transformation to display the virtual environment to a person as a representation of the real-world environment, use the result of the transformation to update a display of the virtual environment, and store the result of the transformation to further represent the real-world environment in other applications. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

Embodiments of the instant disclosure may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
   identifying, via at least one sensor, an object of interest located within a real-world environment;
   mapping an area of the real-world environment surrounding the object of interest by identifying an environmental object comprising at least one restricted access object within the real-world environment surrounding the object of interest, wherein identifying the environmental object comprises determining a location of the environmental object within the real-world environment;
   generating a virtual environment based on the mapped area of the real-world environment surrounding the object of interest by generating a model for use in the virtual environment that represents the environmental object, the model comprising a security notification indicating that the restricted access object is subject to one or more security policies, the security policies indicating that the restricted access object is not to be displayed in the generated virtual environment; and
   displaying, in real-time, the object of interest within the virtual environment, wherein displaying the object of interest within the virtual environment comprises displaying the model that represents the environmental object within the virtual environment at a location within the virtual environment that corresponds to the location of the environmental object in the real-world environment,
   wherein displaying the model includes avoiding rendering the restricted access object within the displayed virtual environment, and
   wherein displaying the model includes automatically pivoting from displaying the object of interest in the virtual environment to displaying the object of interest in a rich representation that includes real-time video upon determining that sufficient bandwidth is available to transfer the real-time video.

2. The computer-implemented method of claim 1, wherein identifying the object of interest located within the real-world environment comprises determining a location of the object of interest within the real-world environment.

3. The computer-implemented method of claim 2, wherein displaying the object of interest within the virtual environment further comprises:
   determining a location within the virtual environment that corresponds to the determined location of the object of interest within the real-world environment; and
   displaying the object of interest within the virtual environment at the determined location within the virtual environment that corresponds to the determined location of the object of interest within the real-world environment.

4. The computer-implemented method of claim 1, wherein:
   the object of interest comprises at least a portion of a person; and
   displaying the object of interest within the virtual environment further comprises displaying the portion of the person within the virtual environment to an additional person.

5. The computer-implemented method of claim 4, wherein identifying the object of interest comprises identifying the person based on at least one attribute of the person.

6. The computer-implemented method of claim 5, wherein the attribute of the person comprises at least one of:
a biometric attribute of the person; or
an identifying token associated with the person.

7. The computer-implemented method of claim 5, further comprising presenting a notification to the additional person comprising an indication of the identity of the person.

8. A computer-implemented method comprising:
identifying, via at least one sensor, an object of interest comprising at least one restricted access object located within a real-world environment;
mapping an area of the real-world environment surrounding the object of interest;
generating a virtual environment based on the mapped area of the real-world environment surrounding the object of interest; and
displaying, in real-time, the object of interest within the virtual environment by displaying a model that represents the restricted access object within the virtual environment, the model comprising:
a security notification indicating that the restricted access object is subject to one or more security policies, the security policies indicating that the restricted access object is not to be displayed in the generated virtual environment,
wherein displaying the model includes avoiding rendering the restricted access object within the displayed virtual environment, and
wherein displaying the model includes automatically pivoting from displaying the object of interest in the virtual environment to displaying the object of interest in a rich representation that includes real-time video upon determining that sufficient bandwidth is available to transfer the real-time video.

9. The computer-implemented method of claim 1, wherein displaying the object of interest within the virtual environment further comprises displaying a real-time video image of the object of interest within the virtual environment.

10. The computer-implemented method of claim 1, wherein displaying the object of interest within the virtual environment further comprises displaying the object of interest within the virtual environment via at least one of:
a video conferencing application;
an augmented reality environment; or
a virtual reality environment.

11. The computer-implemented method of claim 1, wherein the sensor comprises a camera.

12. The computer-implemented method of claim 1, wherein the sensor is included in at least one of a mobile robot or a telepresence robot located in the real-world environment.

13. A system comprising:
an identifying module, stored in memory, that identifies, via at least one sensor, an object of interest located within a real-world environment;
a mapping module, stored in memory, that maps an area of the real-world environment surrounding the object of interest by identifying an environmental object comprising at least one restricted access object within the real-world environment surrounding the object of interest, wherein identifying the environmental object comprises determining a location of the environmental object within the real-world environment;
a generating module, stored in memory, that generates a virtual environment based on the mapped area of the real-world environment surrounding the object of interest by generating a model for use in the virtual environment that represents the environmental object, the model comprising:
a security notification indicating that the restricted access object is subject to one or more security policies, the security policies indicating that the restricted access object is not to be displayed in the generated virtual environment;
a displaying module, stored in memory, that displays, in real-time, the object of interest within the virtual environment, wherein the displaying module displays the object of interest within the virtual environment by displaying the model that represents the environmental object within the virtual environment at a location within the virtual environment that corresponds to the location of the environmental object in the real-world environment,
wherein displaying the model includes avoiding rendering the restricted access object within the displayed virtual environment, and
wherein displaying the model includes automatically pivoting from displaying the object of interest in the virtual environment to displaying the object of interest in a rich representation that includes real-time video upon determining that sufficient bandwidth is available to transfer the real-time video; and
at least one physical processor that executes the identifying module, the mapping module, the generating module, and the displaying module.

14. The system of claim 13, wherein the identifying module identifies the object of interest located within the real-world environment by determining a location of the object of interest within the real-world environment.

15. The system of claim 14, wherein the displaying module further displays the object of interest within the virtual environment by:
determining a location within the virtual environment that corresponds to the determined location of the object of interest within the real-world environment; and
displaying the object of interest within the virtual environment at the determined location within the virtual environment that corresponds to the determined location of the object of interest within the real-world environment.

16. The system of claim 13, wherein the displaying module further displays the object of interest within the virtual environment by displaying the object of interest within the virtual environment via at least one of:
a video conferencing application;
an augmented reality environment; or
a virtual reality environment.

17. A non-transitory computer-readable medium comprising instructions that, when executed by at least one processor of a computing system, cause the computing system to:
identify, via at least one sensor, an object of interest located within a real-world environment;
map an area of the real-world environment surrounding the object of interest by identifying an environmental object comprising at least one restricted access object within the real-world environment surrounding the object of interest, wherein identifying the environmental object comprises determining a location of the environmental object within the real-world environment;
generate a virtual environment based on the mapped area of the real-world environment surrounding the object of interest by generating a model for use in the virtual environment that represents the environmental object, the model comprising:

a security notification indicating that the restricted access object is subject to one or more security policies, the security policies indicating that the restricted access object is not to be displayed in the generated virtual environment;

display, in real-time, the object of interest within the virtual environment, wherein displaying the object of interest within the virtual environment comprises displaying the model that represents the environmental object within the virtual environment at a location within the virtual environment that corresponds to the location of the environmental object in the real-world environment, wherein displaying the model includes avoiding rendering the restricted access object within the displayed virtual environment, and wherein displaying the model includes automatically pivoting from displaying the object of interest in the virtual environment to displaying the object of interest in a rich representation that includes real-time video upon determining that sufficient bandwidth is available to transfer the real-time video.

18. The computer-implemented method of claim 1, wherein generating the model for use in the virtual environment that represents the environmental object comprises:
   obtaining, via the sensor, data associated with at least one attribute of the environmental object;
   determining the attribute of the environmental object based on the data associated with the attribute of the environmental object; and
   generating the model for use in the virtual environment such that the model shares the attribute with the environmental object.

19. The computer-implemented method of claim 8, wherein identifying the object of interest located within the real-world environment comprises determining a location of the object of interest within the real-world environment.

20. The computer-implemented method of claim 19, wherein displaying the object of interest within the virtual environment further comprises:
   determining a location within the virtual environment that corresponds to the determined location of the object of interest within the real-world environment.

21. The computer-implemented method of claim 19, wherein displaying the object of interest within the virtual environment at the determined location within the virtual environment that corresponds to the determined location of the object of interest within the real-world environment.

\* \* \* \* \*